(12) United States Patent
Odell et al.

(10) Patent No.: US 7,061,778 B2
(45) Date of Patent: Jun. 13, 2006

(54) METHOD AND APPARATUS FOR EXTENDING THE OPERATING RANGE OF A FLYFORWARD CONVERTER

(75) Inventors: Arthur B. Odell, Cupertino, CA (US); Richard L. Hester, San Jose, CA (US); Jason E. Cuadra, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 42 days.

(21) Appl. No.: 10/862,223

(22) Filed: Jun. 7, 2004

(65) Prior Publication Data

US 2005/0270810 A1  Dec. 8, 2005

(51) Int. Cl.
*H02M 3/335* (2006.01)

(52) U.S. Cl. .................................. 363/21.01

(58) Field of Classification Search ............ 363/21.01, 363/21.04, 21.09, 21.12, 21.17, 131
See application file for complete search history.

(56) References Cited

U.S. PATENT DOCUMENTS

| 3,602,801 | A | * | 8/1971 | Williamson | ................. 323/290 |
| 4,866,495 | A | | 9/1989 | Kinzer | |
| 5,684,680 | A | | 11/1997 | Tahhan et al. | |
| 5,831,838 | A | * | 11/1998 | Illingworth | ............... 363/21.03 |

FOREIGN PATENT DOCUMENTS

| DE | 3136024 | 3/1983 |
| EP | 05253196 | 7/2005 |

OTHER PUBLICATIONS

Park, J. N. et al., "A Dual Mode Forward/Flyback Converter," *IEEE*, 1982, pp. 3-13, no month.

Taylor, B. E., "The Single Hexfet® Fly-Forward converter—A Novel Topology for Intrinsically Simple Switching Supplies," PCI, Jun. 1986, pp. 9-17.

Chen, W. et al., "Comparisons Between Fly-Forward Converter and Flyback and Forward Converters," *Journal of Nanjing University of Aeronautics and Astronautics*, vol. 29, No. 4, Aug. 1997.

Chen, W. et al., "Theoretical analysis and Experimental Verification of Fly-Forward Converter with LCD Magnetic Resetting," *Journal of Nanjing University of Aeronautics and Astronautics*, vol. 29, No. 3, Jun. 1997.

Sebastian, J. et al., "A Complete Study of the Double Forward-Flyback Converter," *IEEE*, 1988, pp. 142-149, no month.

"Switching Technologies," Sierracin/Power Systems, Chatsworth, CA, no date.

* cited by examiner

*Primary Examiner*—Shawn Riley
(74) *Attorney, Agent, or Firm*—Blakely Sokoloff Taylor & Zafman LLP

(57) ABSTRACT

A technique for extending the operating range of a flyforward converter to low input voltages. In one aspect, power converter includes a positive input supply rail and a negative input supply rail. A power converter input voltage is to be applied between the positive and negative input supply rails. A flyback energy transfer element having a flyback input winding and a forward energy transfer element having a forward input winding are also included. The flyback and forward input windings are coupled between the positive and negative input supply rails. Voltage control circuitry coupled to the forward energy transfer element is also included to reduce a voltage across the forward input winding, substantially to zero, when the power converter input voltage falls below a first threshold value.

28 Claims, 7 Drawing Sheets

METHOD AND APPARATUS FOR EXTENDING THE OPERATING RANGE OF A FLYFORWARD CONVERTER

BACKGROUND OF THE INVENTION

1. Field of the Invention

The present invention relates generally to power converters and, more specifically, the present invention relates to flyforward power converters.

2. Background Information

Power conversion circuits are typically designed to meet cost and efficiency targets defined at the start of a design. The type of power conversion circuit adopted in a particular design determines the overall system cost and operating performance.

One circuit configuration that provides the advantages of high efficiency and low system cost is a power conversion circuit called a flyforward converter. This circuit configuration effectively combines elements of two commonly used converter configurations, the flyback converter and the forward converter.

The flyforward converter includes individual flyback and forward transformers or energy transfer elements each having an input winding and at least one output winding. One of the advantages of the flyforward converter is circuit simplicity since only one power switch is required, which is coupled to the flyback and forward energy transfer element input windings across an input supply rail to the power conversion circuit. This power switch, switches on and off at a frequency determined by a control circuit coupled to the power switch. The frequency, which is the reciprocal of a switching cycle period, at which the power switch switches on and off may be fixed or variable depending on the type of control circuitry adopted.

The flyforward converter provides the combined advantages of efficient use of the flyback and forward energy transfer elements, low RMS current in the power switch and low ripple current in capacitors, which are coupled across the outputs of the flyback and forward energy transfer elements, as will be known to one skilled in the art.

However, the flyforward configuration suffers from a limitation in its operating characteristic, which restricts its use in many practical circuits. To describe this limitation, it is convenient to regard the flyforward converter in terms of the flyback energy transfer element and forward energy transfer element individually. In order for the forward energy transfer element to deliver energy to the power conversion circuit output, it is important that the magnetic flux in the forward energy transfer element at the end of a switching cycle period is reset to substantially the same value as it had at the beginning of the switching cycle period before the power switch is switched on.

During the following description the flux in the magnetic core of the forward energy transfer element at the beginning of a switching cycle period may be referred to as the initial value of the flux. In meeting this criterion, the magnetic core of the forward energy transfer element is prevented from saturating. In order for this operating criterion to be met, a reset voltage appears across the forward energy element input winding during the period of each switching cycle that the power switch is off.

To prevent the forward energy transfer element from saturating, the integral of this reset voltage during the power switch off time period is equal to the magnitude of the integral of the voltage appearing across the forward energy transfer element input winding during the power switch on period. This requirement is often referred to as the volt-second balance and ensures the magnetic flux does not build up in the magnetic core over a number of switching cycle periods, which would result in saturation of the magnetic core.

During the normal operation of a forward converter, in order to maintain the regulation of the voltage across the power conversion circuit output, the power switch on period as a percentage of the overall switching cycle period, which is referred to as the duty cycle, increases as the input voltage to the power converter decreases. The requirement to maintain the volt-second balance therefore requires that the magnitude of the reset voltage, integrated over the power switch off time, increases as the power converter input voltage decreases. This increased reset voltage increases voltage stress on the power switch as well as voltage stress on rectification diodes coupled to the output winding of the forward energy transfer element.

This typically limits the use of the flyforward converter to applications where the range of input voltage applied to the input of the power conversion circuit is very limited. This is a severe limitation since many applications having limited input voltage range specifications under normal operating conditions, have short term transient operating conditions where low input voltage must be tolerated with the power converter remaining fully operational.

Examples of applications where this could be a requirement are television and personal computer power conversion circuits. In these applications, if the input voltage to the power conversion circuit falls below the normal operating value, the power conversion circuit continues to operate long enough that memory back-up and other housekeeping functions can be completed by electronic circuitry coupled to the output of the power converter, before the power conversion circuit output voltage becomes too low. The period of time for which the power conversion circuit operates under these conditions is often referred to as the hold-up period. Although this is only a transient condition in the operation of the power converter, the limitations of the flyforward converter discussed above, make it necessary to rate the voltage of the power switch and output rectifiers to withstand this transient condition. This limitation can greatly increase the cost of the overall converter, making other converter topologies more attractive for this reason alone.

BRIEF DESCRIPTION OF THE DRAWINGS

The present invention detailed illustrated by way of example and not limitation in the accompanying figures.

DETAILED DESCRIPTION

A novel technique to extend the operating range of a flyforward converter is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In general, a simple and novel technique for extending the operating range of a flyforward converter is provided according to embodiments of the present invention. In various embodiments, either the voltage across the forward energy transfer element input winding is reduced substantially to zero or the voltage across the flyback energy transfer element input winding is increased to substantially equal the power converter input voltage during the on period of a power switch, when the power supply input voltage falls below a threshold value in accordance with the teachings of the present invention.

In one embodiment this is achieved by coupling a switch across the forward energy transfer element input winding, which is turned on when the power converter input voltage falls below a threshold value. In another embodiment this is achieved by coupling a switch across an output winding of the forward energy transfer element, which is turned on when the power converter input voltage falls below a threshold value. In one embodiment this is achieved by causing the forward energy transfer element to saturate when the power converter input voltage falls below a threshold value.

Figure 1:
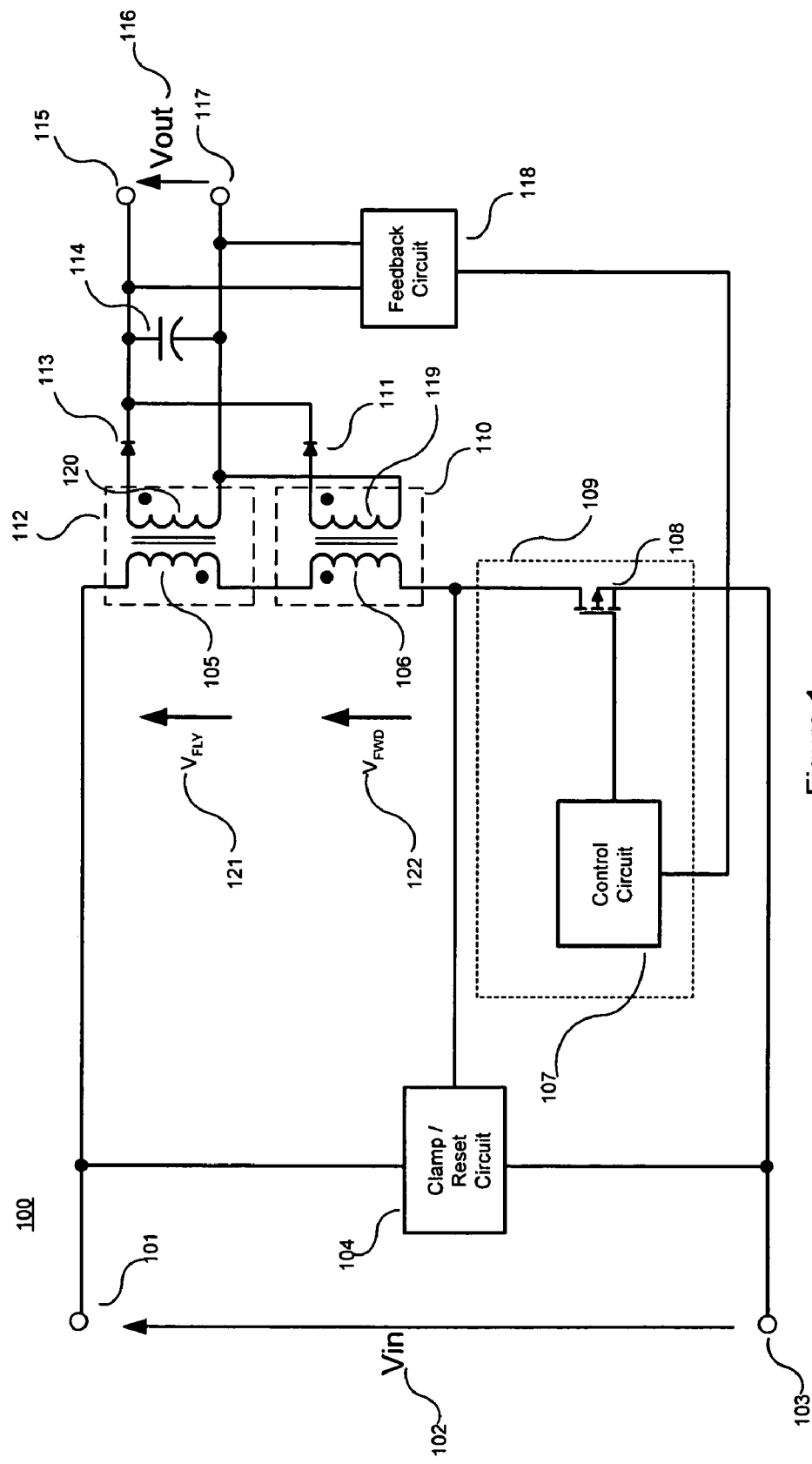
FIG. 1 is a schematic illustrating a flyforward converter

To illustrate, FIG. 1 shows a schematic of a flyforward power converter 100. Flyforward power converter input voltage Vin 102 is applied between positive input supply rail 101 and negative input supply rail 103. Flyback energy transfer element 112 and forward energy transfer element 110 are coupled between input rails 101 and 103 as shown. Flyback energy transfer element 112 has a flyback input winding 105 and forward energy transfer element 110 has a forward input winding 106. Power switch 108 is shown coupled to forward input winding 106.

The order in which the energy transfer elements are coupled between input rails 101 and 103 and which of the input windings 105 or 106 power switch 108 is coupled to, is not important to the operation or understanding of the flyforward converter configuration or the teachings of the present invention.

Power switch 108 is shown directly coupled to the negative supply rail 103 in FIG. 1. However, the converter operation would be unaffected if power switch 108 were instead coupled directly to positive supply rail 101 or between input windings 105 and 106. Control circuit 107 is coupled to power switch 108 and to feedback circuit 118, which is in turn coupled to output rails 115 and 117 and typically detects voltage between the power converter output rails though it can also detect output current flowing at the power converter circuit output or other parameters depending on the converter purpose and design.

Control circuit 107 and power switch 108 may be separate discrete circuit elements or form part of an integrated circuit as illustrated by border 109. Control circuit 107 and power switch 108 may be monolithically integrated within integrated circuit 109. An integrated circuit including circuit elements 107 and 108 can additionally include other functional blocks not shown here so as not to obscure the teachings of the present invention. These considerations of integration apply to all converter embodiments discussed below.

Control circuit 107 is responsive to a signal provided by feedback circuit 118 and determines the period of time for which the power switch 108 is turned on and off during a switching cycle period to regulate an output of the power converter. The percentage of time within a switching cycle period for which power switch 108 is on, is called the duty cycle.

Clamp/reset circuit 104 is shown coupled to forward input winding 106 and power switch 108 and input supply rails 101 and 103. In practice, depending on the type of clamp/reset circuit being used, the clamp/reset circuit 104 may be coupled to only one of the input supply rails 101 or 103. The clamp/reset circuit 104 performs the dual functions of limiting the maximum voltage applied across power switch 108 when it is off and ensuring the magnetic flux in the forward energy transfer element 110 is reset to its initial value before the beginning of the next switching period when control circuit 107 turns on power switch 108.

From FIG. 1, if the voltage across power switch 108 is assumed to be zero during the period that it is on:

$$V_{IN} = V_{FLY} + V_{FWD} \quad (1)$$

where $V_{FLY}$ 121 and $V_{FWD}$ 122 are the applied voltages across the input windings of energy transfer elements 112 and 110 respectively. If the power switch 108 on and off times are defined as $T_{ON}$ and $T_{OFF}$, respectively, the peak voltage across the forward input winding 106 during the off time of power switch 108, to ensure that the magnetic flux in forward energy transfer element 110, is reset substantially to its initial value before the beginning of the next switching period follows the requirement:

$$V_{RESET} \geq \frac{V_{FWD} \times T_{ON}}{T_{OFF}} \quad (2)$$

This is the minimum peak value of the reset voltage. If the reset voltage were constant throughout the off period of the power switch, then (2) would define the minimum value of this constant reset voltage to reset the magnetic core of the forward energy transfer element. $V_{RESET}$ may be a fixed reference value to which the voltage across the input winding of the forward input winding is clamped during the off time if power switch 108, in which case its value also obeys the relationship in (2).

The duty cycle D is defined by the relationship:

$$D = \frac{T_{ON}}{T_{ON} + T_{OFF}} \quad (3)$$

From equation (3), substituting for $T_{ON}/T_{OFF}$ in equation (2) yields the following requirement:

$$V_{RESET} \geq \frac{V_{FWD}}{(1-D)} \quad (4)$$

In a flyforward converter, the input to output turns ratio of the flyback energy transfer element is $$n_{FLY} = \frac{N_{PFLY}}{N_{SFLY}} \quad (5)$$

where $N_{PFLY}$ and $N_{SFLY}$ are the number of input and output turns respectively of the flyback energy transfer element.

The input to output turns ratio of the forward energy transfer element is $$n_{FWD} = \frac{N_{PFWD}}{N_{SFWD}} \quad (6)$$

where $N_{PFWD}$ and $N_{SFWD}$ are the number of input and output turns respectively of the forward energy transfer element.

As will be known to one skilled in the art, in continuous conduction mode, the voltage conversion ratio of the fly-forward converter is:

$$\frac{V_{OUT}}{V_{IN}} = \frac{D}{n_{FLY}(1-D) + n_{FWD}D} \quad (7)$$

Equation (7) can be rearranged, making the duty cycle D the subject:

$$D = \frac{n_{FLY}}{n_{FLY} - n_{FWD} + \frac{V_{IN}}{V_{OUT}}} \quad (8)$$

As can be observed from equation (8) for a given converter design, since all other elements are constant, when $V_{IN}$ falls, the duty cycle D increases.

Since, from equation (4), the reset voltage increases as D increases, to ensure the forward energy transfer element is reset before the next power switch 108 on time, it follows that the reset voltage $V_{RESET}$ increases as $V_{IN}$ is reduced.

The clamp/reset circuit 104 of FIG. 1 is therefore designed to sustain the max $V_{RESET}$ that will be seen during the circuit operation. Furthermore, since the clamp/reset circuit 104 is coupled to power switch 108, the $V_{RESET}$ voltage is one component of the voltage across the power switch 108 during the power switch off period, which may therefore also rise with falling $V_{IN}$. The maximum reverse voltage applied across output diode 111 in FIG. 1, is also proportional to the maximum reset voltage $V_{RESET}$ since this voltage, plus output voltage 116 is applied across diode 111 divided by the turns ratio of the forward energy transfer element $n_{FWD}$.

Figure 2:
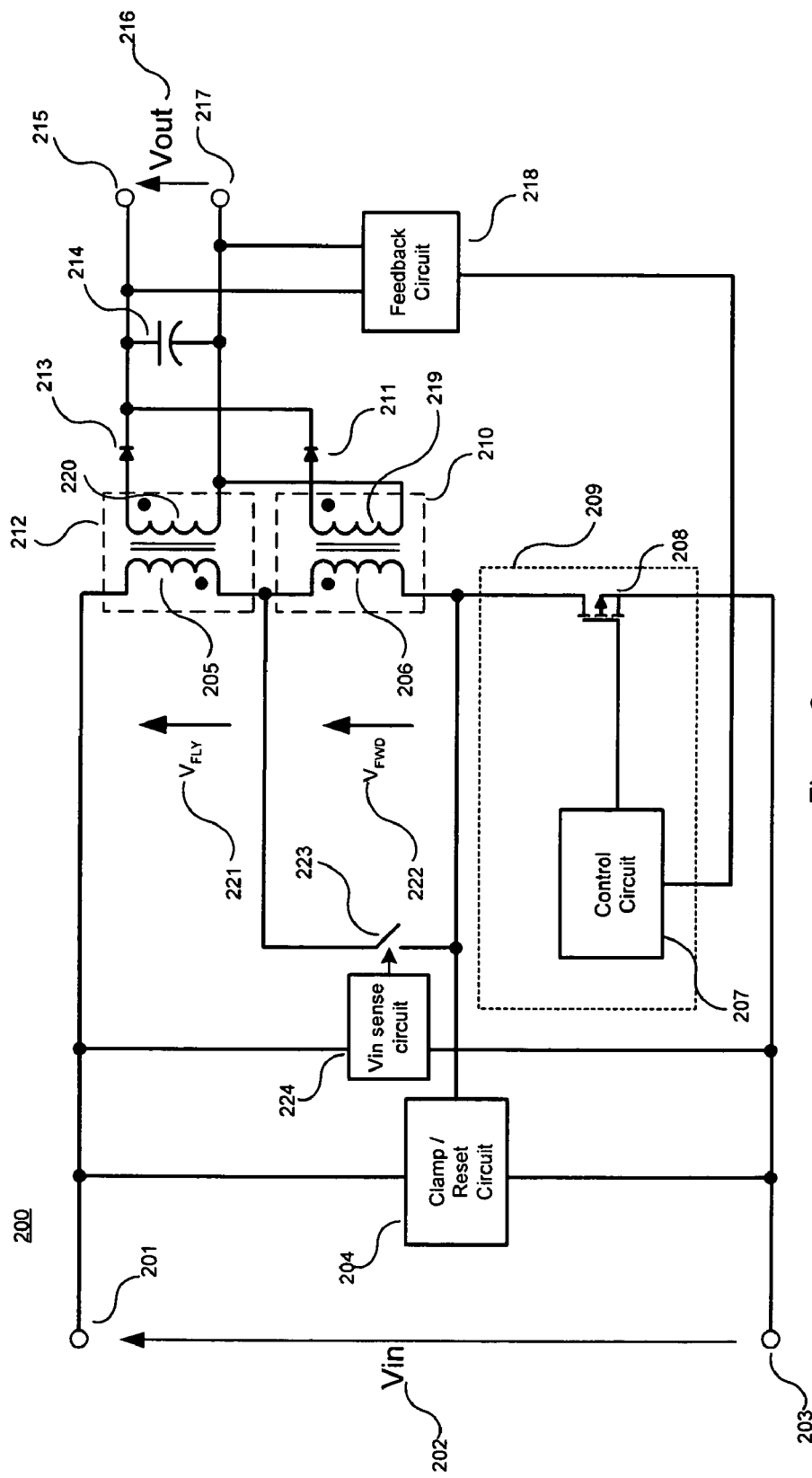
FIG. 2 is a schematic of one embodiment of a circuit in accordance with the teachings of the present invention.

FIG. 2 shows generally a schematic of one embodiment of a circuit benefiting from the teachings of the present invention. In one embodiment, a circuit benefiting from the teachings of the present invention includes voltage control circuitry coupled to the forward energy transfer element in accordance with the teachings of the present invention, which is adapted to reduce the voltage across the forward input winding, substantially to zero, when the power supply input voltage falls below a first threshold value, or is adapted to increase the voltage across the flyback input winding, substantially to equal the power converter input voltage when the power switch is on when the power supply input voltage falls below a first threshold value.

To illustrate, compared to the circuit of FIG. 1, voltage control circuitry including for example a switch 223 is coupled across forward input winding 206, with Vin sense circuit 224 coupled to the switch 223 and the converter input rails 201 and 203. Switch 223 could be a semiconductor switch such as a MOSFET or bipolar transistor in a practical implementation. The Vin sense circuit 224 detects when input voltage Vin 202 is below a threshold value and shorts the forward input winding 206 by closing switch 223.

In practice, Vin sense circuit 224 may detect a first level of Vin 202 to determine when to close switch 223 and may detect a second level of Vin 202 to determine when to open switch 223. This use of first and second voltage levels is used for example to introduce hysteresis to maintain $V_{FWD}$ at substantially zero until the input voltage Vin 202 at the power converter input rises above the second level of Vin 202. In one embodiment, the first and second levels may have the same value, in which case the hysteresis would be zero. Shorting input winding 206 is equivalent to reducing the forward input number of turns to zero and therefore the forward energy transfer element turns ratio to zero in equation (6). Equation (7) then reduces to:

$$\left.\frac{V_{OUT}}{V_{IN}}\right|_{n_{FWD}=0} = \frac{D}{n_{FLY}(1-D)} \quad (9)$$

Equation (9) describes the transfer characteristic of a flyback converter, since the forward converter of FIG. 2 has effectively been removed from the system once switch 223 is closed. This has the advantage that, from equation (4), since $V_{FWD}$ is now substantially zero, $V_{RESET}$ is also substantially zero. As a result, the voltage stress on both the power switch 208 and forward output diode 211 are also reduced.

A benefit of effectively eliminating the forward energy transfer element under conditions of low input voltage can also be seen by rearranging equation (7) to express the minimum input voltage possible for a given maximum power switch duty cycle:

$$V_{INMIN} = V_O\left[n_{FWD} + n_{FLY}\left(\frac{1-D_{MAX}}{D_{MAX}}\right)\right] \quad (10)$$

From equation (10), the value of $V_{INMIN}$ is reduced when $n_{FWD}$ is zero, extending the operating range of the power converter to lower input voltages than would otherwise be the case. It is appreciated that switch 223 could also be coupled across a part of forward input winding 206 instead of the complete winding 206 as shown in FIG. 2. In this case the voltage across input winding 206 could be reduced to substantially zero when switch 223 is closed, allowing the benefits of the present invention to be realized.

Figure 3:
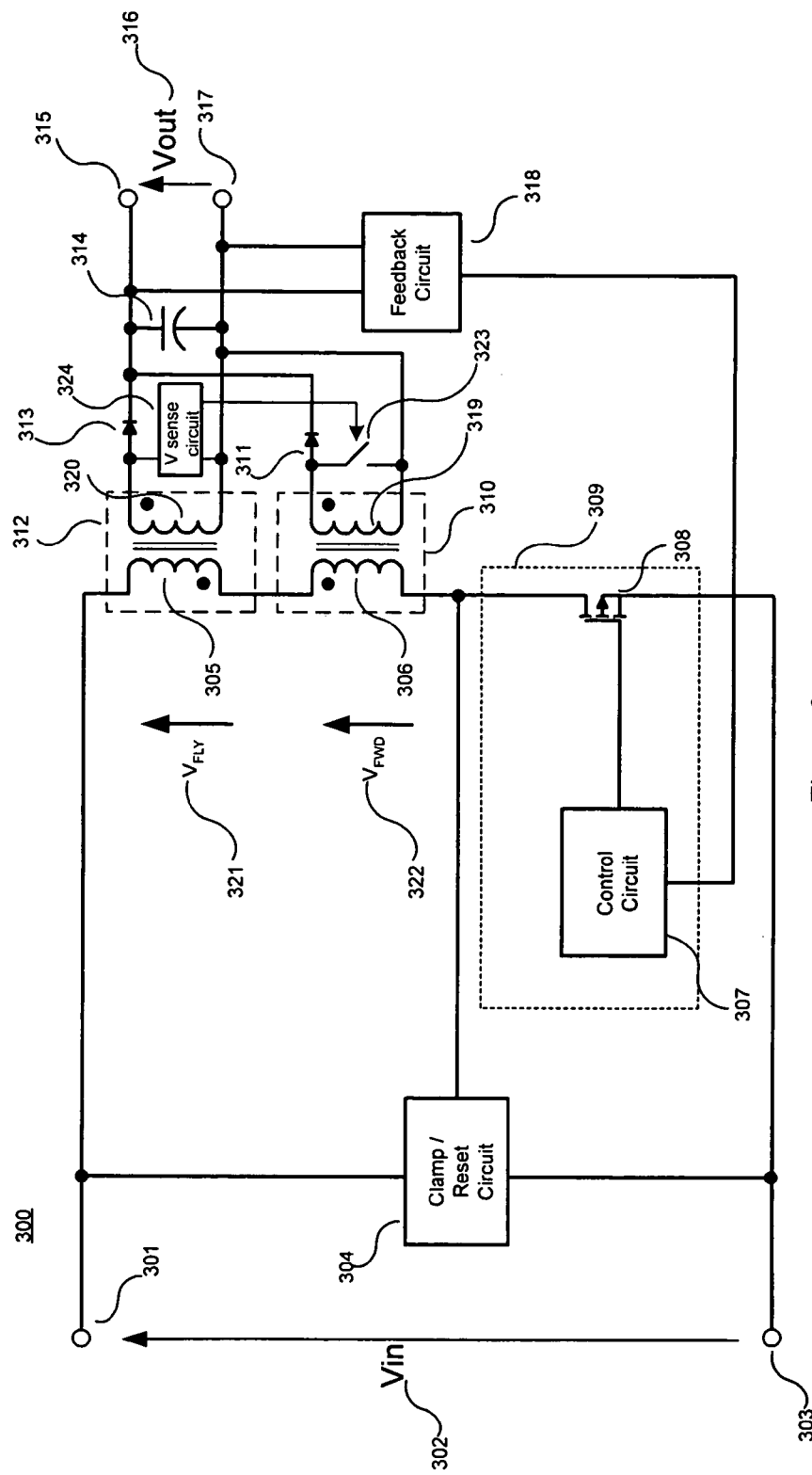
FIG. 3 is a schematic of another embodiment of a circuit in accordance with the teachings of the present invention.

FIG. 3 shows generally another embodiment of a circuit benefiting from the teachings of the present invention, which also includes voltage control circuitry coupled to the forward energy transfer element in accordance with the teachings of the present invention. For instance, in the embodiment of FIG. 3, the output winding 319 of the forward energy transfer element 310 may be shorted using voltage control circuitry including for example switch 323. If the input winding 306 and output winding 319 of forward energy transfer element 310 are perfectly magnetically coupled, applying a short using switch 323 is electrically equivalent to the short applied across input winding 206 in FIG. 2. If input and output windings 306 and 319, respectively, are not perfectly coupled in one embodiment, the voltage across forward input winding 306 will still be substantially zero when switch 323 is closed. This will allow the benefits of the present invention to be realized using a lower voltage switch 323 across the forward output winding 319 rather than the high voltage switch 223 required in the circuit of FIG. 2.

In the embodiment of FIG. 3, the value of the input voltage 302 is determined through V sense circuit 324, which is also positioned on the output side of the power converter. V sense circuit 324 senses the voltage across the flyback output winding 320 when the power switch 306 is on. The voltage across flyback winding 320 can be related to the input voltage 302 using equation (1) when power switch 306 is on. The voltage across output winding 320, is equal to $V_{FLY}$ 321 divided by the turns ratio $n_{FLY}$ of the flyback energy transfer element. Since the value of $V_{FWD}$ is also known in a particular design, being the value of Vout 316 plus the forward voltage drop of diode 311, multiplied by the forward energy transfer element turns ratio $n_{FOR}$, the input voltage 302 can be derived from the voltage sensed by circuit 324. A suitable threshold value of Vin 302 can therefore be selected to turn on switch 323, providing benefits equivalent to those described with reference to the circuit of FIG. 2 in accordance with the teachings of the present invention. In another embodiment of the present invention, a secondary switch such as switch 323 in FIG. 3 may be coupled to a primary Vin sense circuit such as circuit 224 in FIG. 2.

Figure 4:
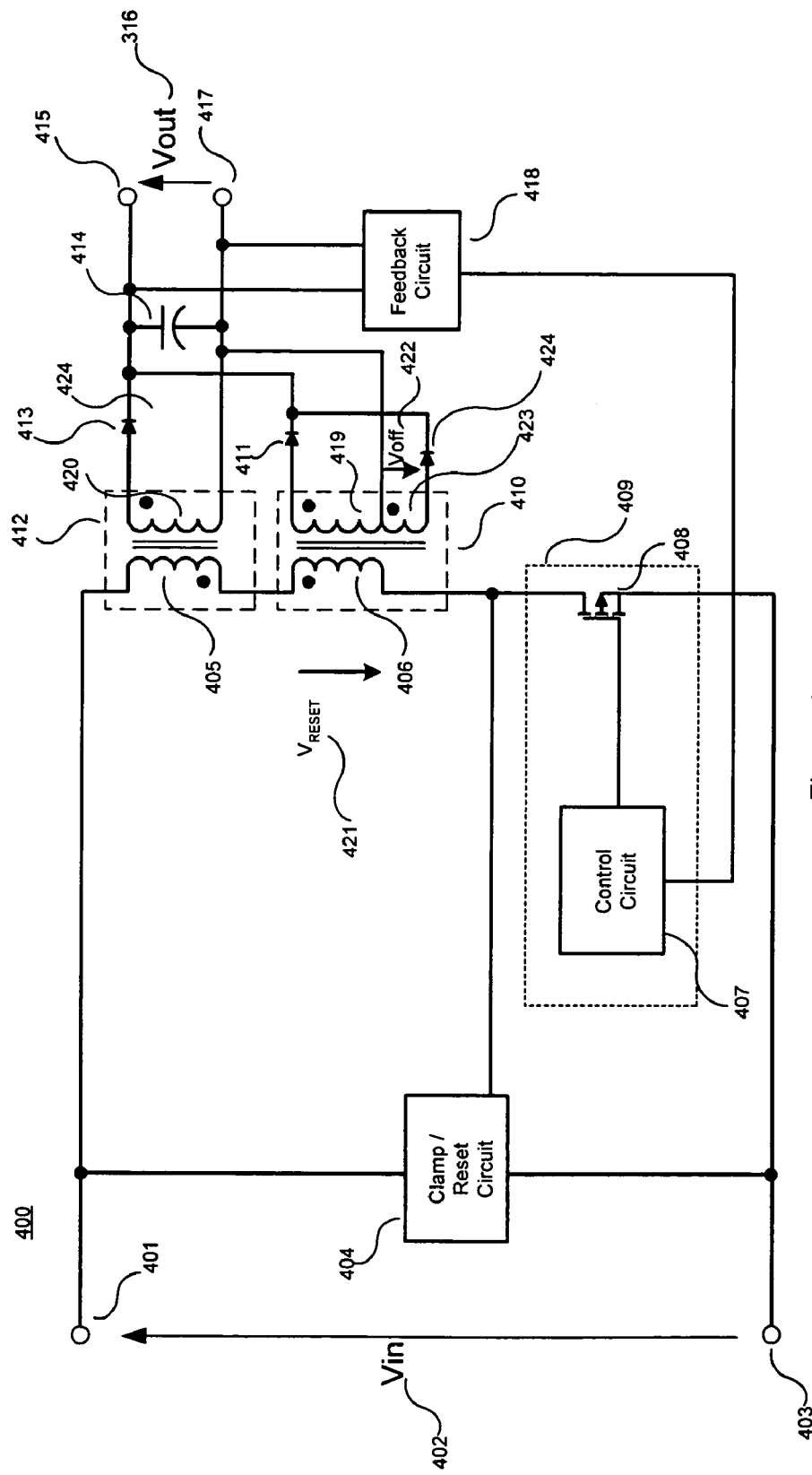
FIG. 4 is a schematic of yet another embodiment of a circuit in accordance with the teachings of the present invention.

FIG. 4 shows generally yet another embodiment of a circuit benefiting from the teachings of the present invention which also includes voltage control circuitry in accordance with the teachings of the present invention. For example, as shown in the embodiment depicted in FIG. 4, the voltage control circuitry includes an output winding 423, wound in the opposite phase to output winding 419, which has been added to the output of the forward energy transfer element 410 and an output diode 424, which is coupled to this output winding 423.

In operation, since winding 423 is wound in the opposite phase to winding 419, a voltage 422 Voff is generated across winding 423 during the off time of the power switch 408 with a polarity that will forward bias output diode 424 if voltage 422 is high enough. However, the voltage 422 is proportional to the $V_{RESET}$ voltage 421 appearing across the input forward winding 406 during the off time of power switch 408. As noted above with reference to the relationship of equations (4) and (8), the reset voltage 421 increases as input voltage 402 reduces.

At some value of input voltage 402, depending on the turns ratio of windings 406 and 423, the value of voltage 422 during the off time of power switch 408, therefore reaches a value where output diode 424 conducts. At this point, the reset voltage 421 across winding 406 of forward energy transfer element 410 is clamped and cannot increase, even if input voltage 402 decreases further.

The consequence of reset voltage 421 being clamped in this way is that the magnetic flux within energy transfer element 410 is not necessarily reset to its initial value before the start of the next switching period when power switch 408 turns on. If energy transfer element 410 does not reset, over a number of switching cycles, the magnetic flux in the magnetic core of forward energy transfer element 410 builds up until the magnetic material of the forward energy transfer element 410 saturates or starts to saturate. In the context of this description, starting to saturate refers to the process whereby the magnetic flux in the core of the energy transfer element is not fully reset ot its initial value and so builds up over a number of switching cycles but is not high enough to fully saturate the magnetic core material. Once the forward energy transfer element 410 is saturated or starts to saturate, it can no longer deliver energy to the output of the power converter.

Under these circumstances, the electrical impedance of forward input winding 406 falls to substantially zero and therefore effectively becomes a short circuit. Therefore, the voltage across the forward input winding is reduced, substantially to zero, as a result of the saturation or as a result of forward energy transfer element 410 starting to saturate when the power supply input voltage falls below a first threshold value in accordance with the teachings of the present invention.

In a practical circuit, some voltage does appear across forward input winding 406 during the power switch 408 on time due to winding impedance. In addition, since voltage Voff 422 is finite, there is a finite reset voltage during the power switch 408 off time, which reduces the magnetic flux somewhat before the beginning of the next switching cycle. This requires that some additional flux is required at the beginning of the next switching cycle to saturate the forward energy transfer element 410. However, for practical purposes the voltage across forward input winding 406 is reduced enough that the circuit therefore benefits from the teachings of the present invention as described with reference to FIGS. 2 and 3.

In one embodiment, the exact calculation of the number of turns of output winding 423 and the resulting threshold value of input voltage 302 at which the forward energy transfer element 410 begins to saturate, is affected by factors such as the type of output diodes 411 and 424 used, which influence the voltage across these components when they conduct. Other factors include the impedance of energy transfer element windings and the magnetic material used in and the physical size of the magnetic core of the forward energy transfer element 410. These factors are consistent once a design is finalized but may vary between individual circuit designs. As such, the number of turns used in output winding 423 in one embodiment is determined by prototype construction and bench testing in order to satisfy the requirements of the particular application being addressed.

Other factors such as for example the core material used in forward energy transfer element 410 have the effect that although the magnetic flux in the magnetic core of forward energy transfer element 410 is no longer reset to its initial value when the input voltage 402 falls below a threshold value, the input voltage 402 will need to fall further before the forward energy transfer element 410 is fully saturated. In operation, the power converter 400 may therefore transition from operation as a flyforward converter to operation as effectively a flyback converter over a range of input voltages.

The description of the embodiments discussed above describe benefits of reducing the voltage across for example forward input windings 206, 306 and 406 to substantially zero during the on time of power switch 208, 308 and 408. This aspect is equivalent to increasing the voltage across flyback input windings 205, 305 and 405 to substantially equal converter input voltages 202, 302 and 402 assuming that the voltage across power switches 208, 308 and 408 is substantially zero when they are on.

Figure 5:
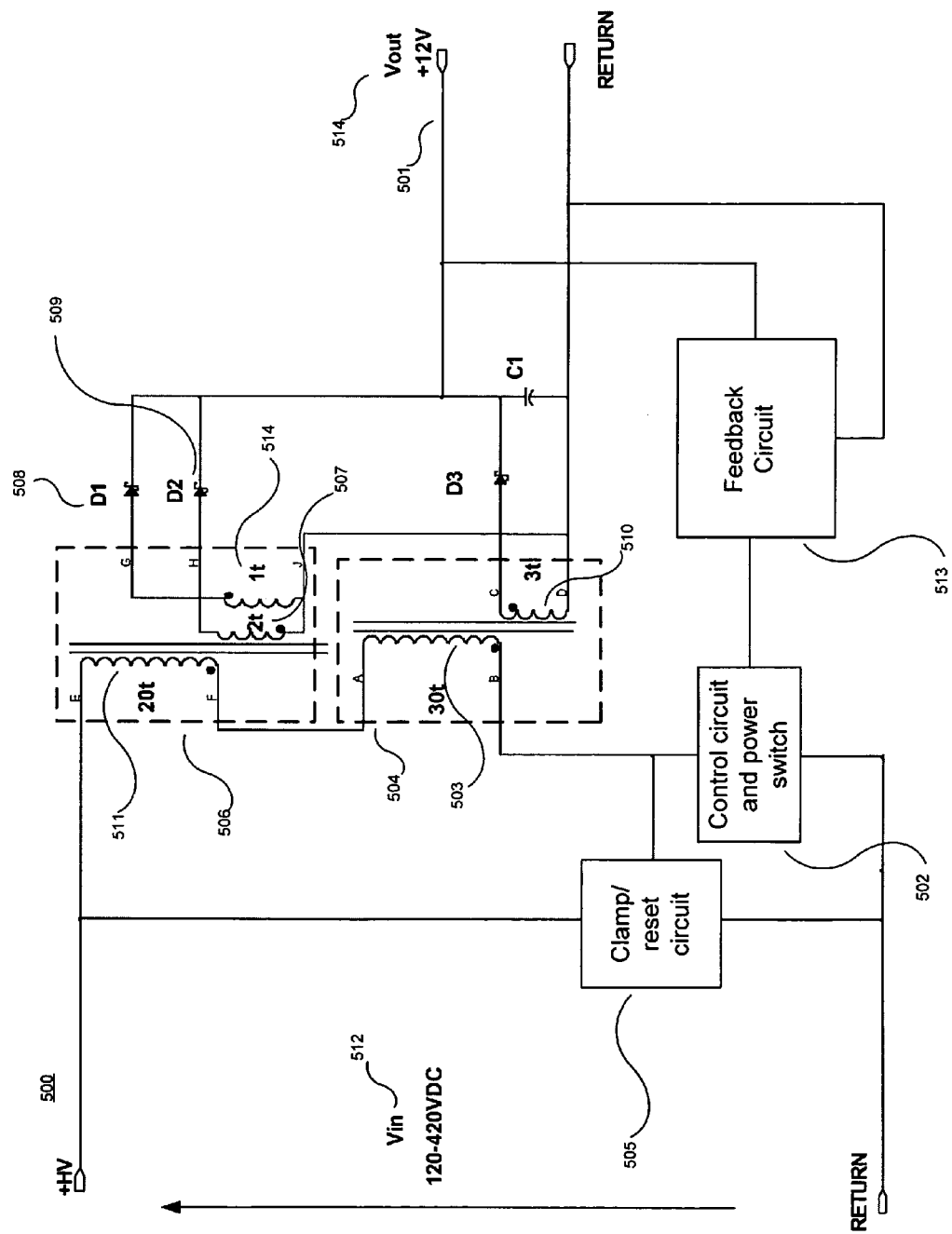
FIG. 5 is a schematic of still another embodiment of a circuit in accordance with the teachings of the present invention.

FIG. 5 shows generally still another embodiment of a circuit 500 benefiting from the teachings of the present invention. As shown in the depicted embodiment, an integrated circuit 502 includes both a power switch and control circuit, which controls the duty cycle of the power switch in response to a signal provided by feedback circuit 513. In one embodiment, integrated circuit 502 may also receive other signals, including but not limited to for example a signal responsive to the instantaneous current flowing in the power switch, which are not detailed in this description so as not to obscure the teachings of the present invention. In one embodiment, circuit 500 also includes an energy transfer element 506, which is a forward energy transfer element. Circuit 500 further includes an energy transfer element 504, which is a flyback energy transfer element.

In one embodiment, circuit 500 utilizes a technique similar to that introduced above with reference to FIG. 4. In the depicted embodiment, an output winding 514, wound in the opposite phase to forward output winding 507, is also included as part of the forward energy transfer element 506, which clamps the maximum reset voltage across the input winding 511 when diode 508 conducts into power conversion output rail 501. In one embodiment, diode 508 conducts into power conversion output rail 501 at a threshold value of the input voltage 512 determined by the turns ratio of forward energy transfer element 506.

By limiting the reset voltage across input winding 511, the forward energy transfer element 506 saturates allowing circuit 500 to benefit from the teachings of the present invention as described above with reference to FIG. 4. In one embodiment, the forward energy transfer element 506 saturates when the relationship in equation (4) can no longer be maintained.

To illustrate, with the winding turns shown, if output diode 508 is assumed to have a forward voltage drop of for example 0.5V, with a Vout 514 of for example 12V and a winding turns ratio of for example 20 between forward input winding 511 and output winding 514, the output diode 508 will start conducting when the reset voltage across forward input winding 511 is (12+0.5)×20=250 Volts. This therefore clamps the voltage across winding 514, which in turn defines the maximum voltage that can be developed across forward input winding 511 during the off time of the power switch within 502.

In one embodiment, the forward energy transfer element 506 has a turns ratio between windings 511 and 507 of for example $n_{FWD}$=20/2=10. Again assuming for example a forward voltage drop of 0.5V across diode 508, $V_{FWD}$ across forward winding 511 will be (12+0.5)×10=125V. Using these example values of $V_{FWD}$=125V and $V_{RESET}$=250V and rearranging equation (4) yields a duty cycle D of 0.67. Using for example Vout=12V, $n_{FWD}$=10, $n_{FLY}$=30/3=10 and D=0.67 and rearranging equation (7) yields, $V_{IN}$=179 Volts which is the input voltage 512 value at which saturation of forward energy transfer element 506 is initiated.

Figure 6:
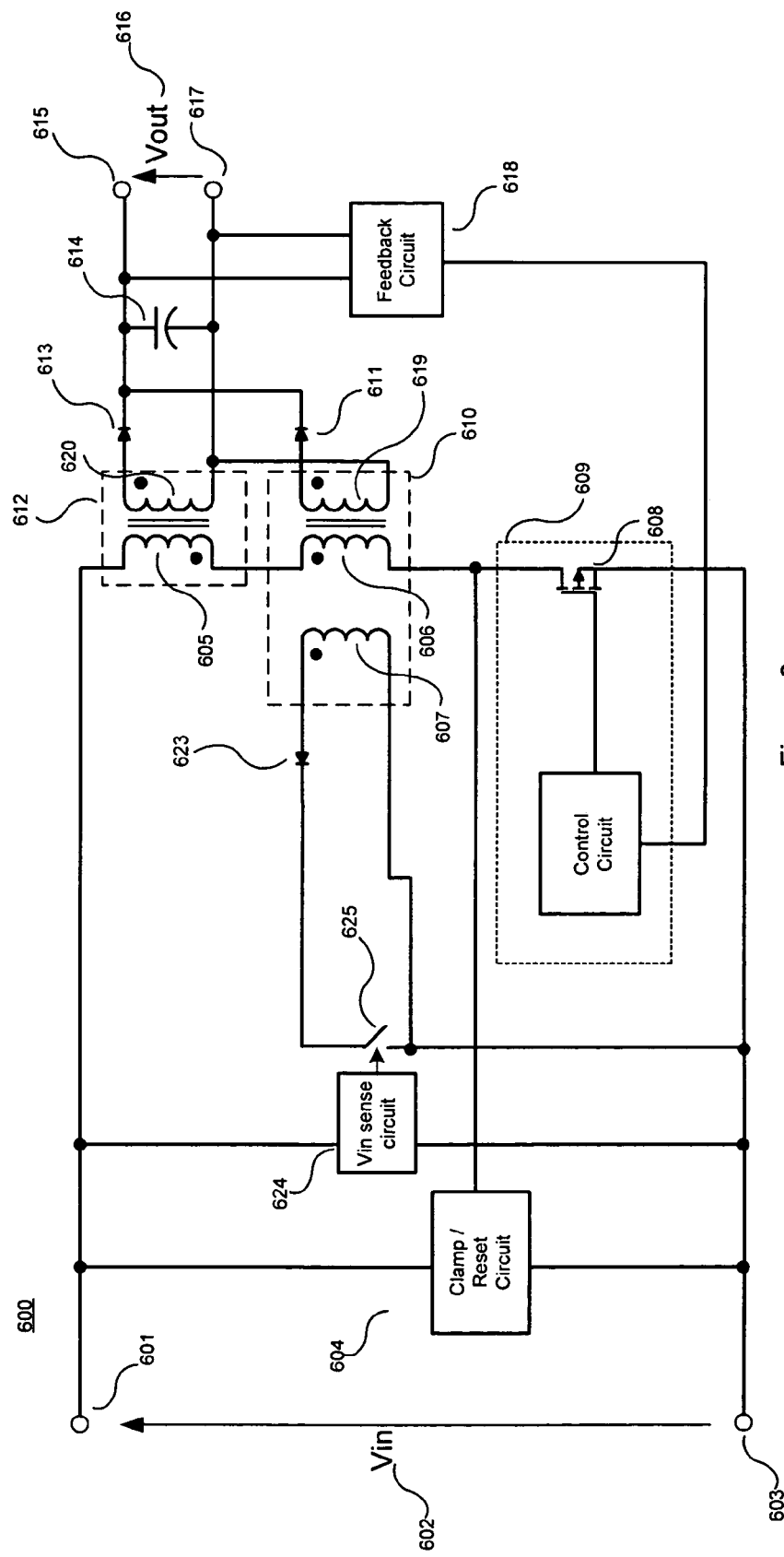
FIG. 6 is a schematic of still another embodiment of a circuit in accordance with the teachings of the present invention.

FIG. 6 shows generally another embodiment of a circuit benefiting from the teachings of the present invention, which includes voltage control circuitry coupled to the forward energy transfer element 610 in accordance with the teachings of the present invention. For instance, in the embodiment of FIG. 6, the winding 607, which is wound in the same polarity as forward input winding 606, may be shorted using voltage control circuitry including for example switch 625. If the winding 606 and winding 607 of forward energy transfer element 610 are perfectly magnetically coupled, applying a short using switch 625 is electrically equivalent to the short applied across input winding 206 in FIG. 2. If windings 606 and 607, are not perfectly coupled in one embodiment, the voltage across forward input winding 606 will still be substantially zero when switch 625 is closed. This will allow the benefits of the present invention to be realized using a lower voltage switch 625 across the winding 607 which can be constructed with fewer winding turns than winding 606, rather than the high voltage switch 223 required in the circuit of FIG. 2 which is applied across the forward input winding 206.

In the embodiment of FIG. 6, the value of the input voltage 602 is determined through Vin sense circuit 624. Vin sense circuit 624 is coupled to the switch 625 and the converter input rails 601 and 603. Switch 625 could be a semiconductor switch such as a MOSFET or bipolar transistor in a practical implementation. Depending on the type of switch 625 used, a diode 623 may be required to prevent reverse conduction through switch 625 during the off period of power switch 608, however with other types of switch, diode 623 would not be necessary. The Vin sense circuit 624 detects when input voltage Vin 602 is below a threshold value and shorts the winding 67 by closing switch 223.

In practice, Vin sense circuit 624 may detect a first level of Vin 602 to determine when to close switch 623 and may detect a second level of Vin 602 to determine when to open switch 625. This use of first and second voltage levels is used for example to introduce hysteresis.

Figure 7:
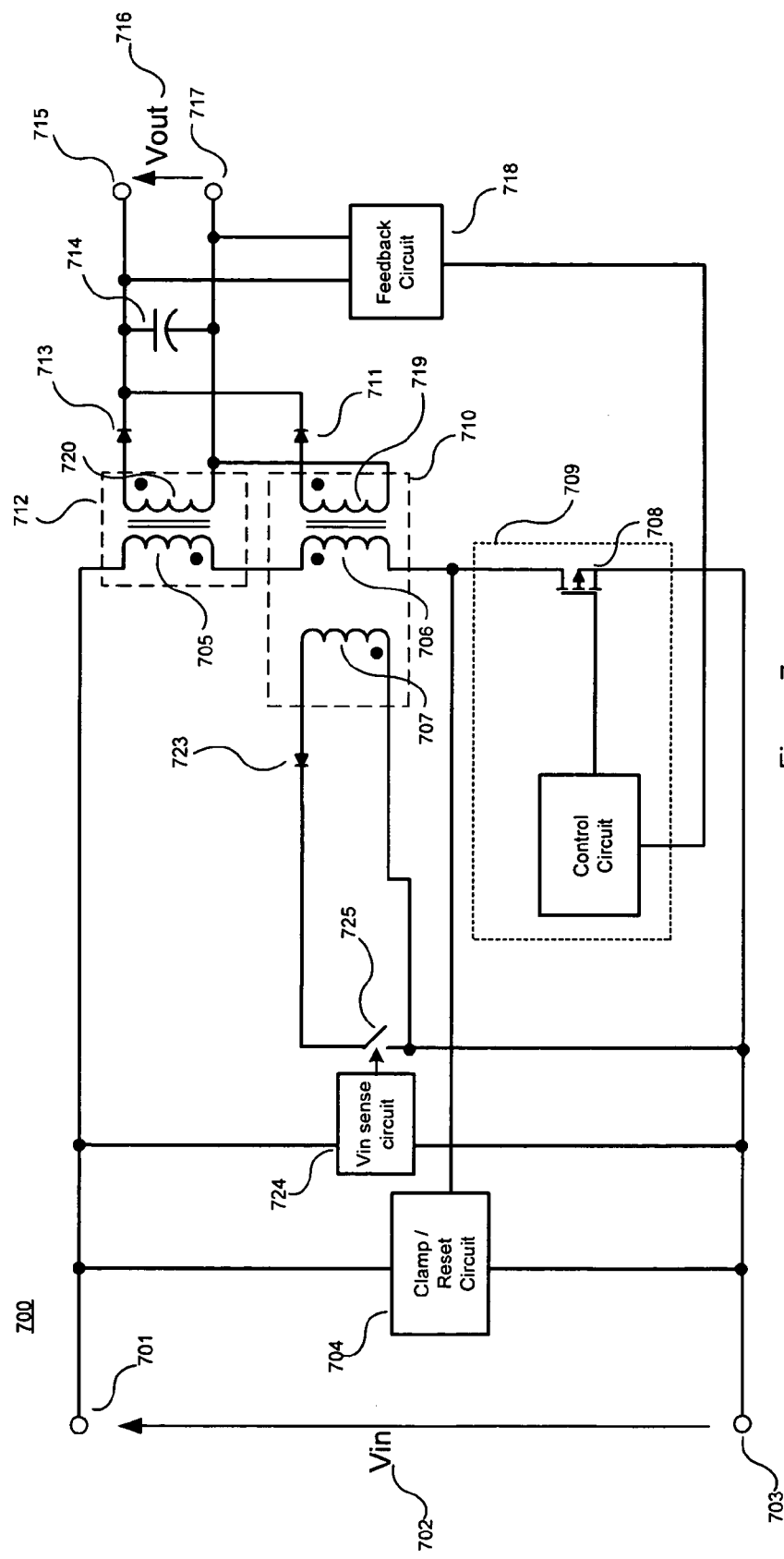
FIG. 7 is a schematic of still another embodiment of a circuit in accordance with the teachings of the present invention.

FIG. 7 shows generally another embodiment of a circuit benefiting from the teachings of the present invention, which includes voltage control circuitry coupled to the forward energy transfer element 710 in accordance with the teachings of the present invention. For instance, in the embodiment of FIG. 7, a winding 707, which is wound in the opposite polarity to forward input winding 706, may be shorted using voltage control circuitry including for example switch 725. By closing switch 725, the reset voltage appearing across winding 706 during the off time of power switch 708, is clamped to a low value, preventing the magnetic flux within the magnetic core of energy transfer element 710 to reset to its initial value before the beginning of the next switching cycle. As described above with reference to FIG. 4, under these conditions the magnetic core of energy transfer element 710 saturates, causing the electrical impedance of forward input winding 706 to fall to substantially zero. The embodiment shown in FIG. 7 therefore allows the benefits of the present invention to be realized using a low voltage switch 725 as winding 707 can be constructed with a low number of winding turns. As will be known to one skilled in the art, the winding 707 could also be coupled on the output of energy transfer element 710 and the switch 725 could for example be switched using a V sense circuit similar the circuit 324 shown in FIG. 3.

In the embodiment of FIG. 7, the value of the input voltage 702 is determined through Vin sense circuit 724. Vin sense circuit 724 is coupled to the switch 725 and the converter input rails 701 and 703. Switch 725 could be a semiconductor switch such as a MOSFET or bipolar transistor in a practical implementation. Depending on the type of switch 725 used, a diode 723 may be required to prevent reverse conduction through switch 725 during the on period of power switch 708, however with other types of switch, diode 723 would not be necessary. The Vin sense circuit 724 detects when input voltage Vin 702 is below a threshold value to determine the point at which switch 725 is turned on.

In practice, Vin sense circuit 724 may detect a first level of Vin 702 to determine when to close switch 723 and may detect a second level of Vin 702 to determine when to open switch 725. This use of first and second voltage levels is used for example to introduce hysteresis.

In the foregoing detailed description, the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A power converter, comprising:
   a positive input supply rail and a negative input supply rail, wherein a power converter input voltage is to be applied between the positive and negative input supply rails;
   a flyback energy transfer element having a flyback input winding;
   a forward energy transfer element having a forward input winding, wherein the flyback and forward input windings are coupled between the positive and negative input supply rails; and
   voltage control circuitry coupled to the forward energy transfer element to reduce a voltage across the forward input winding, substantially to zero, when the power converter input voltage falls below a first threshold value.

2. The power converter of claim 1 wherein the voltage control circuitry is adapted to maintain the voltage across the forward input winding at substantially zero until the power converer input voltage rises above a second threshold value.

3. The power converter of claim 2 wherein the second threshold value is greater than the first threshold value.

4. The power converter of claim 2 wherein first and second threshold values are substantially equal.

5. The power converter of claim 1 wherein the voltage control circuitry comprises a switch coupled across the forward input winding.

6. The power converter of claim 1 wherein the voltage control circuitry comprises a switch coupled across an output winding of the forward energy transfer element.

7. The power converter of claim 1 wherein the voltage control circuitry is adapted to cause the forward energy transfer element to saturate.

8. The power converter of claim 1 wherein the voltage control circuitry is adapted to cause the forward energy transfer element to start to saturate.

9. The power converter of claim 1 further comprising a power switch coupled to at least one of the forward input winding or flyback input winding.

10. The power converter of claim 9 wherein the power switch is further coupled to one of the positive or negative input rails.

11. The power converter of claim 9 further comprising a control circuit coupled to the power switch; wherein the control circuit and power switch are included in an integrated circuit.

12. The power converter of claim 11 the control circuit and power switch are monolithically integrated as part of the integrated circuit.

13. A power converter, comprising:
    a positive input supply rail and a negative input supply rail, wherein a power converter input voltage is to be applied between the positive and negative input supply rails;
    a flyback energy transfer element having a flyback input winding;
    a forward energy transfer element having a forward input winding;
    a power switch, wherein the flyback and forward input windings and the power switch are coupled between the positive and negative input supply rails, wherein the voltage across the power switch is substantially zero when the power switch is on; and
    voltage control circuitry coupled to the forward energy transfer element to increase the voltage across the flyback input winding, substantially to equal the power converter input voltage when the power switch is on when the power converter input voltage falls below a first threshold value.

14. The power converter of claim 13 wherein the voltage control circuitry is adapted to maintain the voltage across the flyback input winding, substantially to equal the power converter input voltage, until the power converter input voltage rises above a second threshold value.

15. The power converter of claim 14 wherein the second threshold value is greater than the first threshold value.

16. The power converter of claim 14 wherein the first and second threshold values are substantially equal.

17. The power converter of claim 13 wherein the voltage control circuitry comprises a switch coupled across the forward input winding.

18. The power converter of claim 13 wherein the voltage control circuitry comprises a switch coupled across an output winding of the forward energy transfer element.

19. The power converter of claim 13 wherein the voltage control circuitry is adapted to cause the forward energy transfer element to saturate.

20. The power converter of claim 13 wherein the voltage control circuitry is adapted to cause the forward energy transfer element to start to saturate.

21. The power converter of claim 13 further comprising a control circuit coupled to the power switch; wherein the control circuit and power switch form part of an integrated circuit.

22. The power converter of claim 21 wherein the control circuit and power switch are monolithically integrated as part of the integrated circuit.

23. A method, comprising:
    receiving an input voltage at an input of a flyforward converter;
    switching a power switch of the flyforward converter to regulate an output of the flyforward converter; and
    increasing a voltage across an input winding of a flyback energy transfer element of the flyforward converter to a value substantially equal to the input voltage at the input of the flyforward converter when the power switch is on when the input voltage at the input of the flyforward converter falls below a threshold value.

24. The method of claim 23 further comprising maintaining a voltage across an input winding of a flyback energy transfer element of the flyforward converter to a value substantially equal to the input voltage at the input of the flyforward converter until the input voltage at the input of the flyforward converter rises above a second threshold value.

25. A method, comprising:
    receiving an input voltage at an input of a flyforward converter;
    switching a power switch of the flyforward converter to regulate an output voltage of the flyforward converter; and reducing a voltage across an input winding of a forward energy transfer element of the flyforward converter to substantially zero when the input voltage at the input of the flyforward converter falls below a threshold value.

26. The method of claim 25 further comprising maintaining the voltage across the input winding of the forward energy transfer element of the flyforward converter at substantially zero until the input voltage at the input of the flyforward converter rises above a second threshold value.

27. A method, comprising:

receiving an input voltage at an input of a flyforward converter;

switching a power switch of the flyforward converter to regulate an output of the flyforward converter; and saturating a forward energy transfer element of the flyforward converter when the input voltage at the input of the flyforward converter falls below a threshold value.

28. A method, comprising:

receiving an input voltage at an input of a flyforward converter;

switching a power switch of the flyforward converter to regulate an output of the flyforward converter; and starting saturation of a forward energy transfer element of the flyforward converter when the input voltage at the input of the flyforward converter falls below a threshold value.

* * * * *